(12) United States Patent
or et al.

(10) Patent No.: US 10,664,896 B2
(45) Date of Patent: May 26, 2020

(54) LOCATION AND TRANSACTION-BASED RECOMMENDATIONS

(71) Applicants: yan or, San Francisco, CA (US); Anand Kumar Sankaran, Fremont, CA (US); Madhu Gopinathan, Bangalore (IN); Vinu Sundaresan, Fremont, CA (US)

(72) Inventors: yan or, San Francisco, CA (US); Anand Kumar Sankaran, Fremont, CA (US); Madhu Gopinathan, Bangalore (IN); Vinu Sundaresan, Fremont, CA (US)

(*) Notice: Subject to any disclaimer, the term of this patent is extended or adjusted under 35 U.S.C. 154(b) by 233 days.

(21) Appl. No.: 15/942,574

(22) Filed: Apr. 2, 2018

(65) Prior Publication Data

US 2019/0108572 A1  Apr. 11, 2019

Related U.S. Application Data

(63) Continuation-in-part of application No. 13/766,689, filed on Feb. 13, 2013, now abandoned.

(51) Int. Cl.
| G06Q 30/06 | (2012.01) |
| G06Q 30/02 | (2012.01) |
| H04W 4/14 | (2009.01) |
| G06K 9/62 | (2006.01) |

(52) U.S. Cl.
CPC ....... *G06Q 30/0631* (2013.01); *G06K 9/6267* (2013.01); *G06Q 30/0201* (2013.01); *G06Q 30/0639* (2013.01); *H04W 4/14* (2013.01)

(58) Field of Classification Search
CPC ................................................. G06Q 30/00–08
See application file for complete search history.

(56) References Cited

U.S. PATENT DOCUMENTS

| 6,317,718 B1 * | 11/2001 | Fano | G06Q 10/109 |
| | | | 705/14.39 |
| 7,174,312 B2 * | 2/2007 | Harper | G06Q 10/0635 |
| | | | 705/35 |
| 8,051,077 B2 * | 11/2011 | Carter | G06F 16/9537 |
| | | | 707/724 |

(Continued)

OTHER PUBLICATIONS

Electronics; Toys"R"Us Implements NewEnhancements in Mobile Functionality, Catering to On-The-Go Shoppers Just in Time for the Holiday Season. Anonymous . Computers, Networks & Communications ; Atlanta [ Atlanta]Nov. 25, 2010: 1482. (Year: 2010).*

*Primary Examiner* — Michael Misiaszek

(57) ABSTRACT

A recommendation server provides product or service suggestions to a user based on transaction and location data. The recommendation server receives transaction data from a merchant device operated by a merchant affiliate. The transaction data contains information that is used to identify a suggested product or service. A search vicinity is determined based on the location of the merchant affiliate and the suggested product or service. A suggested merchant is determined that is located within the search vicinity, and that sells the suggested product or service. Information about the suggested merchant and the suggested product or service is sent to a user device operated by the user in order to encourage them to make a purchase from the suggested merchant.

9 Claims, 3 Drawing Sheets

(56) References Cited

U.S. PATENT DOCUMENTS

| | | | |
|---|---|---|---|
| 2006/0047577 A1* | 3/2006 | Dietz | G06Q 30/06 |
| | | | 705/26.1 |
| 2006/0087474 A1* | 4/2006 | Do | G01S 1/024 |
| | | | 342/386 |
| 2011/0145051 A1* | 6/2011 | Paradise | G06Q 30/02 |
| | | | 705/14.25 |
| 2011/0238478 A1* | 9/2011 | Gottfurcht | G06Q 20/105 |
| | | | 705/14.25 |
| 2013/0203439 A1* | 8/2013 | Lifshitz | H04W 64/00 |
| | | | 455/456.2 |
| 2014/0058886 A1* | 2/2014 | Gopalakrishnan | G06Q 30/02 |
| | | | 705/26.8 |

* cited by examiner

Recommendation Module

LOCATION AND TRANSACTION-BASED RECOMMENDATIONS

CROSS-REFERENCE TO RELATED APPLICATIONS

This application claims priority to U.S. patent application Ser. No. 13/766,689 filed on Feb. 13, 2013. This non-provisional patent application is hereby incorporated by reference in its entirety.

BACKGROUND

This invention relates generally to computer generated recommendations for consumers and, in particular, to generating consumer recommendations based on location data and transaction data.

Advertisers and marketers today often target consumers with marketing messages containing information about products and services, where the messages are tailored for those consumers based on their purchasing patterns. For example, a retailer may track the purchases made by a consumer and may predict products that are likely to be bought by the consumer in the future based on this data. Coupons for these predicted products may be sent in an email message to the consumer to entice them to buy more products from the retailer. Such targeted marketing can be effective for some classes of products since consumer purchasing patterns may be predictable for those classes of products. However, these sorts of marketing techniques are less effective for some classes of products and services because consumer interest in related products and services may be very time and location sensitive. For example, when consumers dine at a restaurant they may often be in the market for a movie afterwards. However, sending a movie ticket through email to the consumers may be ineffective because, first, a coupon for a movie theater may not be of interest to the consumer unless that movie theater is proximate to the restaurant. Second, a coupon for a movie ticket sent through email to the consumer may not be seen by that consumer until later (say the next day), in which case the coupon would not be effective in enticing the consumer to a specific theater.

Thus, there is a need for a technology that can deliver product and service recommendations within time and location constraints that provide relevance to the consumer.

BRIEF SUMMARY OF THE INVENTION

A recommendation server system for automatically generating a short-messaging service (SMS) message that provides product or service suggestions to a user includes a computer server configured for generating a merchant affiliate record in a merchant affiliate database. The merchant affiliate record comprises a set of records comprising information describing a set of available products. Each record for a product or service comprises a price information, a reference to a related product or service within the database, and an expected maximum travel distance that describes a largest expected distance that a consumer is willing to travel to purchase the product or service. The expected maximum travel distance is a function of the cost of the product or service with the cost the product or service increasing the expected maximum travel distance. The computer server is configured for receiving, with at least one computer processor of the recommendation server, transaction data from a merchant device, the transaction data including information about a transaction between a merchant affiliate and the user. The computer server is configured for identifying, with the recommendation server, a suggested product or service based on the transaction data; determining, with the recommendation server, a geographical location for the user based on a location associated with the merchant affiliate. The geographical location is determined by accesses the merchant affiliate record in the merchant affiliate database accessible by the recommendation server; determining a search vicinity for the user based on the expected maximum travel distance for the suggested product or service. The computer server is configured for selecting, with the recommendation server, a suggested merchant associated with a location within the search vicinity based on the suggested product or service, and wherein the computer server for selecting a suggested merchant associated with a location within the search vicinity based on the suggested product or service, is further configured for: accessing an affiliate record associated with a candidate merchant; determining if the affiliate record indicates that the candidate merchant sells the suggested product or service and that the candidate merchant is associated with a location within the search vicinity; and responsive to the determining that the affiliate record indicates that the candidate merchant sells the suggested product or service and that the candidate merchant is associated with a location within the search vicinity, selecting the candidate merchant; automatically generating, with the recommendation server, an SMS message; automatically generating a content of the SMS message, wherein the content comprises an information about the suggested product or service and the suggested merchant to a user device operated by the user; and sending the SMS message to a mobile device of the user.

BRIEF DESCRIPTION OF THE DRAWINGS

The present application can be best understood by reference to the following description taken in conjunction with the accompanying figures, in which like parts may be referred to by like numerals.

Figure 1:
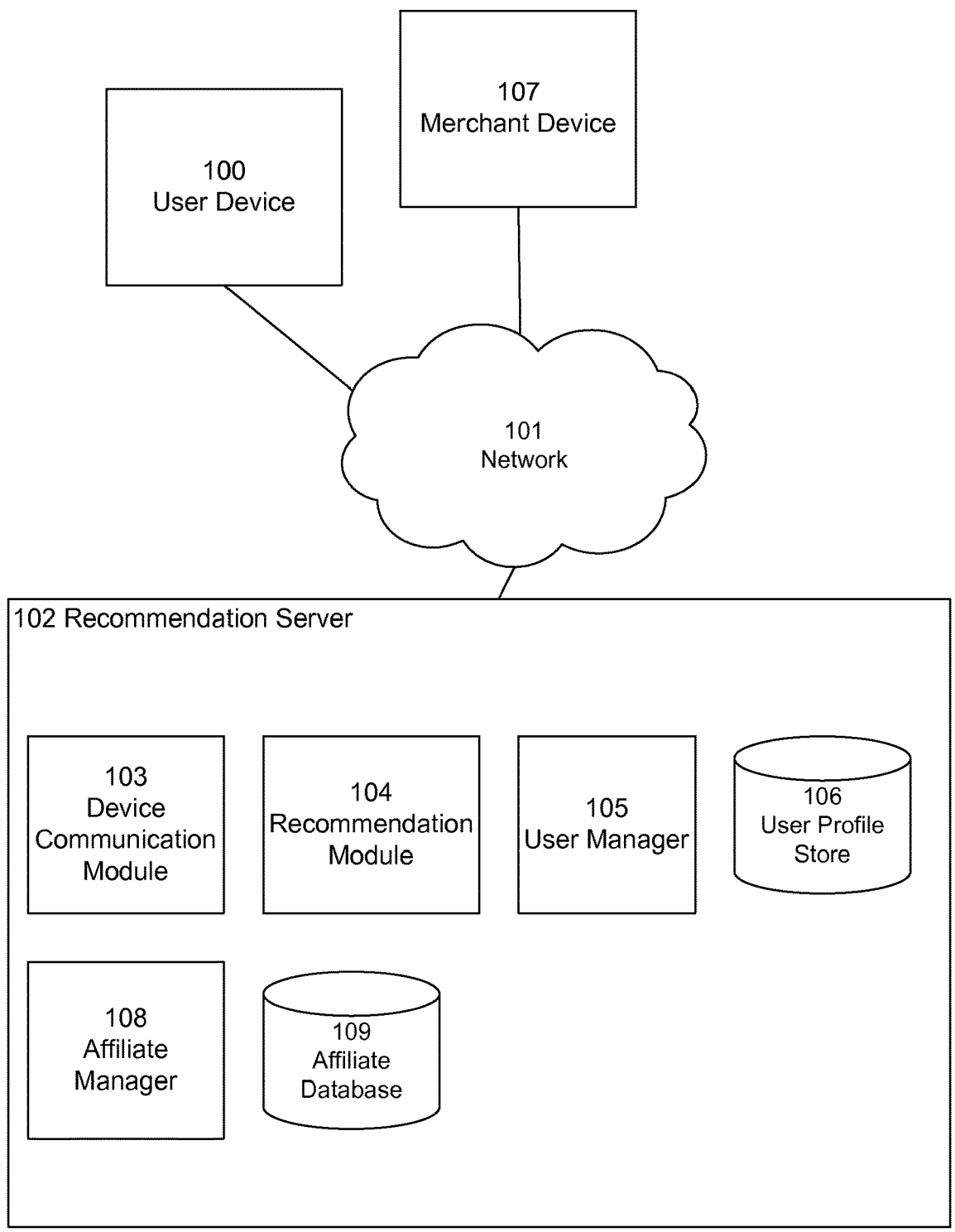
FIG. 1 is a block diagram of a system environment including an embodiment of a recommendation server.

The Figures described above area representative yet and are not exhausted with respect to embodying the invention.

DESCRIPTION

Disclosed are a system, method, and article of manufacture of location and transaction-based recommendations. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention.

Thus, appearances of the phrases "in one embodiment," "in an embodiment," and similar language throughout this specification may, but do not necessarily, all refer to the same embodiment.

Furthermore, the described features, structures,or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In, other instances, well-known structures, materials, or operations are not shown or described in detail to avoid obscuring aspects of the invention.

The schematic flow chart diagrams included herein, are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

System Overview

FIG. 1 illustrates the recommendation server 102 operating in a networked environment. Here the recommendation server connected via a network 101 with a single user device 100 and a single merchant device 107, but in practice the recommendation server 102 may communicate with a plurality of user devices 100 and merchant devices 107.

The user devices 100 may be any device with, the ability to communicate with the recommendation server 102, such as smart phones, tablets, laptops, personal computers, cell phones, etc. A user operating a user device 100 can receive and view a message from the recommendation server 102. The message may be communicated to the user device 100 through any communication means, including through Short Message Service (SMS), through email, etc. The message from the recommendation server 102 contains marketing information promoting a product or service offered by one or more suggested merchants, which are predicted to be relevant to the user at the current time and location. A user may view the messages from the recommendation server 102, and based on the information in the messages may be motivated to visit one or more of the suggested merchants to purchase one or more of the recommended products and services. The messages may take the form of advertisements or coupons with discounts to motivate action from the user.

The merchant devices 107 are operated by merchants such as product retailers, service providers, etc., who are affiliated with the recommendation server 102. The merchant devices 107 may be any device capable of sending data to the recommendation server 102, such as, for example, personal computers, point of sale devices, tablets, electronic cash registers, vending machines, etc. The merchant devices 107 send transaction data containing information about transactions conducted between users and merchant affiliates, to the recommendation server 102. The transaction data is sent from the merchant device 107 to the recommendation server 102 as the transaction is conducted between the user and the merchant affiliate, or soon after the transaction has been completed. In this way the recommendation server 102 is given real-time or nearly real-time information about a transaction. The transaction data may contain information describing products and services that have been purchased by the user in the transaction with the merchant affiliate and may identify the location of the store where the transaction took place.

The network 101 provides a communication infrastructure between the user devices 100, the merchant devices 107, and the recommendation server 102. The network 101 may include cellular networks, the Internet, a Local Area Network (LAN), a Metropolitan Area Network (MAN), a Wide Area Network (WAN), a mobile wired or wireless network, a private network, a virtual private network, etc.

The recommendation server 102 receives transaction data from the merchant, devices 107 and generates messages containing product or service promotions for suggested merchants that are sent back to the user devices 100. These messages may be in the form of advertisements, coupons, mobile alerts, etc. The messages may be sent to the user devices as SMS (text), email, or any other mobile communication method. In the illustrated embodiment, the recommendation server 102 comprises a device communication module 103, a recommendation module 104, a user manager 105, a user profile store 106, an affiliate manager 108, and an affiliate database 109.

The device communication module 103 handles communication with the user devices 100 and the merchant devices 107. The device communication module 103 enables the recommendation server 102 to perform common communications-related operations on messages that are sent and received, such as encryption/decryption, compression/decompression, authentication, etc. Transaction data from merchant devices 107 is received by the device communication module 103 and sent to the recommendation module 104, and messages with product recommendations generated by the recommendation module 104 are sent by the device communication module 103 to the user devices 100.

The user manager 105 enables users operating the user devices 100 to establish a user account with the recommendation server 102. The user manager 105 may receive information about users operating the user devices 100, from the user devices 100 or from other sources such as directories, retailers, credit agencies, banks, etc. Some user information may be provided by users when they establish a new account with the recommendation server 102, and other information may be collected passively by the user manager 105 over the course of time, as transaction data concerning a user is sent to the recommendation server 102 from merchant affiliates.

The user profile store 106 stores the information about users that has been received or collected by the user manager 105. Information about a user may be aggregated and stored by the user manager 105 in a user profile for that user. The user profile for a user may contain information about the user such as age, sex, address, product preferences, store preferences, purchase history, stores frequented, etc.

The affiliate manager 108 enables merchants to establish an account with the recommendation server 102. Merchants that have established an account with the recommendation server 102 are called merchant affiliates. The merchant affiliates operate the merchant devices 107 that send transaction data to the recommendation server 102. When a merchant affiliate establishes an account with the recommendation server 102, the affiliate manager 108 receives business information from the merchant affiliate. The business information provides a description of the merchant's business that can be used to determine when users should be directed to that merchant. For example, the business information provided to the recommendation server 102 may include information about products or services offered by the merchant, locations for stores operated by the merchant, store hours for the merchant, etc. The information for each merchant affiliate is stored in an affiliate record in the affiliate database 109. The affiliate manager 108 may also receive information from merchant affiliates describing advertisements, coupons, and other inducements offered by those merchants. When it is determined that a user may be interested in products or services offered by a particular merchant affiliate, that merchant's coupons or advertisements may be sent in a message to the user. The process for determining when to send a particular merchant's information to a user is described in more detail herein.

The recommendation module 104 receives transaction data about a transaction between a user and a merchant affiliate, from a merchant device 107 operated by that merchant, and generates a message containing promotional information about a product or service offered by a suggested merchant, which is relevant to the user and which can be sent to the user device 100 operated by the user. The communication to and from the user device 100 and merchant device 107 can be conducted via the device communication module 103, as described earlier, and can take the form of emails, SMS messages, etc. The recommendation module 104 utilizes information in the user profile store 105 and the affiliate database 109, in addition to the transaction data, to determine the product or service that is relevant to the user. The recommendation module 104 is discussed in more detail below. Recommendation Module.

Figure 2:
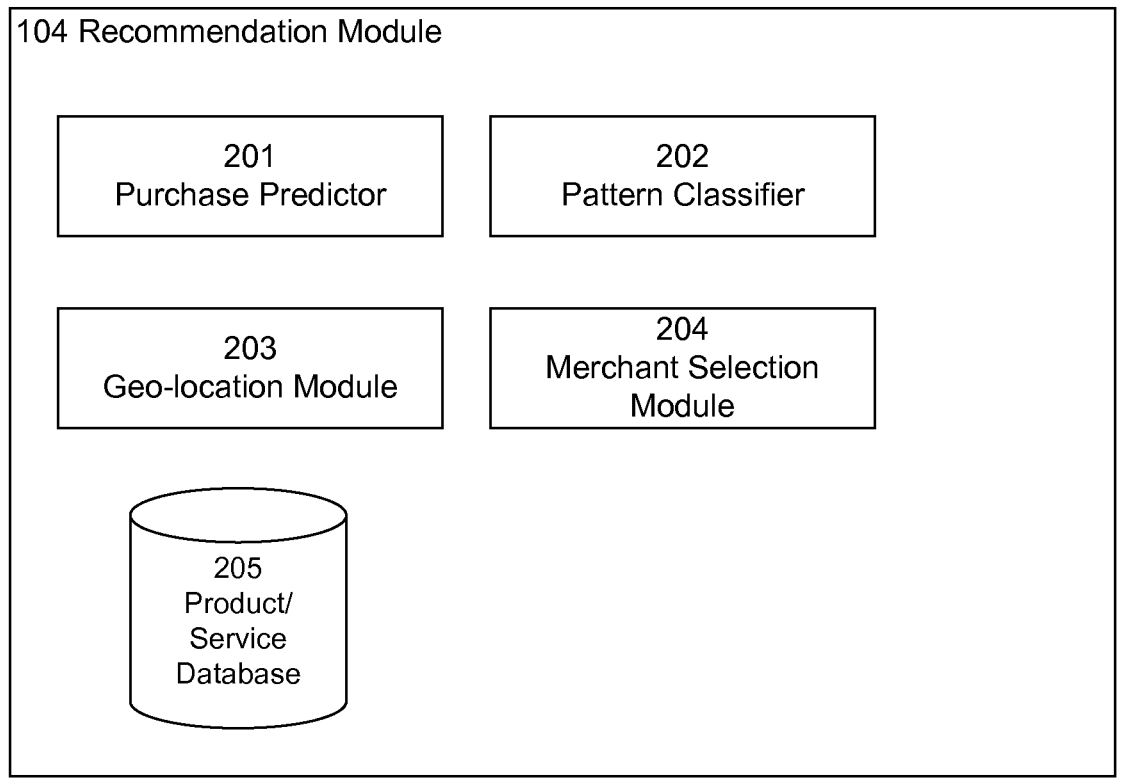
FIG. 2 is a block diagram showing a detailed view of one embodiment of a recommendation module.

FIG. 2 illustrates a detailed view of the components of the recommendation module 104, according to one embodiment. In the illustrated embodiment, the recommendation module 104 comprises a purchase predictor 201, a pattern classifier 202, a geo-location module 203, a merchant selection module 204, and a product/service database 205.

The purchase predictor 201 uses information in the transaction data received from a merchant affiliate to determine a suggested product or service that will be relevant to the user in the immediate future. The purchase predictor 201 uses the product/service database 205 and the pattern classifier 202 to determine a product or service that is likely to be purchased by a user based on their recent purchases.

The product/service database 205 comprises records containing information describing various products and services available in the market. The record for a product or service may contain data such as price information, references to related products and services within the database, as well as references to affiliate records in the affiliate database 109 for merchants that offer the product or service for sale. The record for a product or service may also contain an expected maximum travel distance that describes the largest expected distance that a consumer would travel to purchase that product or service. For example, simple goods such as candy, soda, snacks, etc., may have a relatively small expected maximum travel distance, say 1000 yards, since consumers are not expected to be willing to travel far to buy such goods. On the other hand, an expensive product such as a television, automobile, or boat, may have a relatively large expected maximum travel distance, say 50 miles, since consumers may be willing to travel greater distances to obtain a better price or match.

The pattern classifier 202 takes the information about a user's recent purchases, from the transaction data, as input, along with information from the user's profile (such as purchase history, demographic information, etc.), and selects a product or service from the product/service database 205 that is predicted to be currently relevant to the user. In one embodiment, the pattern classifier 202 is a statistical model that is developed by the administrators of the recommendation server 102. In another embodiment the pattern classifier 202 is a machine-learned model that is trained to predict the purchasing patterns of consumers based on historical purchase data of users.

The geo-location module 203 determines a geographical location or a user based on transaction data received from a merchant device 107 and then determines a search vicinity for the user. The geographical location for the user may not be the exact location of the user, but rather may be an approximate location that is determined based on the location of a merchant affiliate store where a transaction took place. The advantage of this approach is that a location for a user may be determined even when the user device 100 operated by the user does not possess geo-locating capabilities. In one embodiment, the geo-location module 203 fixes the approximate geographical location of the user based on location data that is included in the transaction data received by the recommendation server 102 from the merchant device 107. In another embodiment, the transaction data includes an identifier for the merchant affiliate and/or the store where the transaction occurred, and the geo-location module 203 accesses an affiliate record in the affiliate database 109 to determine a geographical location associated with the merchant and/or the store in the record.

The search vicinity is a geographical zone around the user's current estimated location within which suggested merchants are expected to be relevant to the user. Merchants outside the search vicinity are not expected to be relevant to the user because they are too far from the user's current estimated location. Once the geographical location is determined, the search vicinity can be determined by estimating the zone within which the user is expected to travel to shop in the near future. The search vicinity is determined by the geo-location module 104 based on the geographical location for the user and the suggested product or services from the product/service database 205 that has been identified as relevant for the user by the purchase predictor 201. For example, if the suggested product identified by the purchase predictor 201 is an item with a relatively small expected maximum travel distance, the search vicinity will include only a small area around the user's geographic location. If the geographic location of the user is associated with a known structure/area that is known to constrain user movement, such as, for example, a mall, railway station, airport, etc., the search vicinity can be conformed to the known structure/area. This improves the selection of suggested merchants since users do not typically leave a structure/area such as a mall for minor purchases such as drinks, snacks, etc.

The merchant selection module 204 selects a suggested merchant for a user from the affiliate database 109 based on the suggested product or service and the search vicinity. To select a merchant from the affiliate database 109, the merchant selection module 204 may access the records of a plurality of merchant affiliates to determine candidate merchants that offer the suggested product or service. The merchant selection module 204 may then select a candidate merchant that is associated with a location within the search vicinity as the suggested merchant if multiple candidate merchants are present within the search vicinity, a suggested merchant can be selected on the basis of other information such as the price of the suggested product or service, the value of coupons or promotions offered by the candidates, the distance between the geographical location of the user and the candidate merchants, etc.

Once the suggested merchant is selected, a message containing information about the selected product or service can be sent by the recommendation module 104 to the user device 100 operated by the user. The message may contain information about the suggested merchant from the affiliate database 109, such as, for example, an address for a store of the merchant, a coupon for the suggested product or service, etc. Generating Location and Transaction-Based Recommendations.

Figure 3:
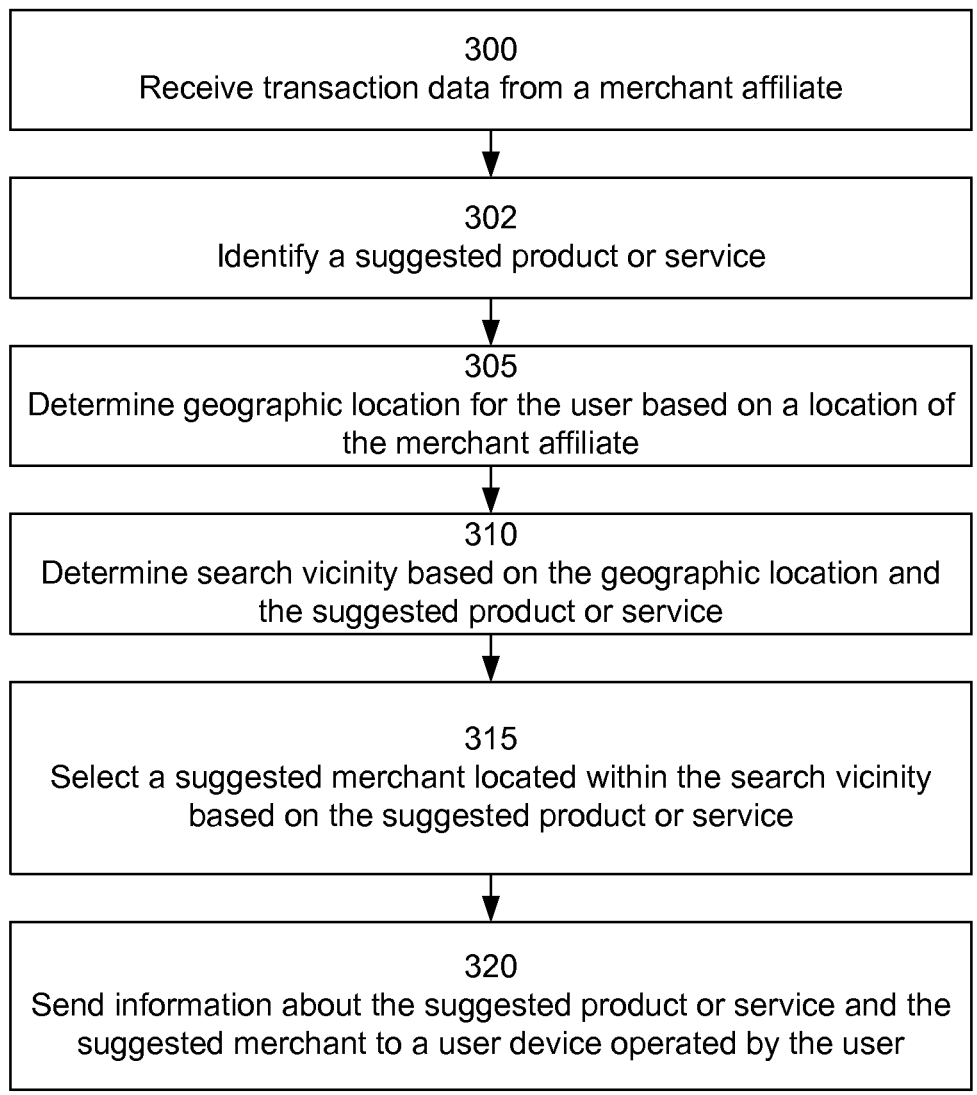
FIG. 3 is a flow chart of a process for generating location and transaction-based recommendations.

FIG. 3 illustrates an example process used by the recommendation server 102 to generate location and transaction-based recommendations, according to one embodiment. In the illustrated process the recommendation server 102 receives 300 transaction data, via the device communication module from a merchant device 107 operated by a merchant affiliate. The transaction data comprises information about a transaction that has been conducted between a user and the merchant affiliate. The transaction may be the purchase of some product or service at a store operated by the merchant affiliate.

A purchase predictor 201 identifies 302 a suggested product or service that is predicted to by relevant to the user, based on the transaction data. Information in the transaction data describing products or services purchased by the user from the merchant affiliate may be used by a pattern classifier 202 to identify the suggested product or service in a product/service database 205.

A geographic location for the user is then determined 305 by a geo-location module 203 based on a location of the merchant affiliate. The location of the merchant affiliate can be determined by the geo-location module 203 based on the transaction data received from the merchant device 107, or it can be determined by accessing a record for the merchant affiliate in an affiliate database 109.

A search vicinity for the user is then determined 310 by the geo-location module 203 based on both the geographic location for the user and the suggested product or service. The search vicinity may be constrained based on a structure/area associated with the geographic location, and the suggested product or service may also constrain the size of the search vicinity based on an expected maximum travel distance for the product/service type.

A suggested merchant associated with a location within the search vicinity is then selected 315 by a merchant selection module 204 based on the suggested product or service. To determine the suggested merchant, the merchant selection module 204 may access the affiliate database 109 to select a candidate merchant that sells the suggested product or service and that is associated with a location within the search vicinity. [0033] Finally, information about the suggested product or service and the suggested merchant is sent 320 to a user device 100 operated by the user. The information may include promotional material such as coupons and other inducements to encourage the user to make a purchase from the suggested merchant.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be, appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for automatically generating a short-messaging service (SMS) message that provides product or service suggestions to a user comprising:
  generating a product/service database that comprises a set of records comprising information describing a set of available products, wherein each record for a product or service comprises a price information, a reference to a related product or service within the database, and an expected maximum travel distance that describes a largest expected distance that a consumer is willing to travel to purchase the product or service, and wherein the expected maximum travel distance is a function of the cost of the product or service with the cost the product or service increasing the expected maximum travel distance;
  receiving, with a recommendation server, transaction data from a merchant device, the transaction data comprising information about a transaction between a merchant affiliate and the user;
  identifying, with the recommendation server, a suggested product or service based on the transaction data;
  determining, with at least one computer processor of the recommendation geographical location for the user based on a location associated with the merchant affiliate, wherein the geographical location is determined by accesses a merchant affiliate record in a merchant affiliate database accessible by the recommendation server;
  determining, with the recommendation server, a search vicinity for the user based on the geographical location and the suggested product service, and wherein determining a search vicinity for the user based on the geographical location and the suggested product or service, further comprises:
  determining a search vicinity for the user based on the largest expected distance that the user is willing to travel to purchase the product or service;
  selecting, with the recommendation server, a suggested merchant associated with a location within the search vicinity based on the suggested product or service, and wherein selecting a suggested merchant associated with a location within the search vicinity based on the suggested product or service, further comprises:

accessing affiliate record associated with a candidate merchant;

determining if the affiliate record indicates that the candidate merchant sells the suggested product or service and that the candidate merchant is associated with a location within the search vicinity; and responsive to the determining that the affiliate record indicates that the candidate merchant sells the suggested product or service and that the candidate merchant is associated with a location within the search vicinity, selecting the candidate merchant;

automatically generating, with the recommendation server, an SMS message;

automatically generating a content of the SMS message, wherein the content comprises an information about the suggested product or service and the suggested merchant to a user device operated by the user; and sending the SMS message to a mobile device of the user.

2. The method of claim 1, wherein the transaction data is received immediately after the transaction between the user and the merchant affiliate is completed.

3. The method of claim 1, wherein the transaction data further comprises:

information about a product or service purchased by the user from the merchant affiliate.

4. The method of claim 3, wherein identifying a suggested product or service, further comprises:

using pattern classifier to determine a suggested product or service based on the product or service purchased by the user from the merchant affiliate.

5. A recommendation server system for automatically generating a short-messaging service (SMS) message that provides product or service suggestions to a user comprising a computer server configured for:

generating a merchant affiliate record in a merchant affiliate database, wherein the merchant affiliate record comprises a set of records comprising information describing a set of available products, wherein each record for a product or service comprises a price information, a reference to a related product or service within the database, and an expected maximum travel distance that describes a largest expected distance that a consumer is willing to travel to purchase the product or service, and wherein the expected maximum travel distance is a function of the cost of the product or service with the cost the product or service increasing the expected maximum travel distance;

receiving, with at least one computer processor of the recommendation server, transaction data from a merchant device, the transaction data comprising information about a transaction between a merchant affiliate and the user;

identifying, with the recommendation server, a suggested product or service based on the transaction data;

determining, with the recommendation server, a geographical location for the user based on a location associated with the merchant affiliate, wherein the geographical location is determined by accesses the merchant affiliate record in the merchant affiliate database accessible by the recommendation server;

determining a search vicinity for the user based on the expected maximum travel distance for the suggested product or service;

selecting, with the recommendation server, a suggested merchant associated with a location within the search vicinity based on the suggested product or service, and wherein the computer server for selecting a suggested merchant associated with a location within the search vicinity based on the suggested product service, is further configured for:

accessing an affiliate record associated with candidate merchant;

determining if the affiliate record indicates that the candidate merchant sells the suggested product or service and that the candidate merchant is associated with a location within the search vicinity; and responsive to the determining that the affiliate record indicates that the candidate merchant sells the suggested product or service and that the candidate merchant is associated with a location within the search vicinity, selecting the candidate merchant;

automatically generating, with the recommendation server, an SMS message;

automatically generating a content of the SMS message, wherein the content comprises an information about the suggested product or service and the suggested merchant to a user device operated by the user; and sending the SMS message to a mobile device off the user.

6. The system of claim 5, wherein the transaction data is received immediately after the transaction between the user and the merchant affiliate is completed.

7. The system of claim 5, wherein the transaction data further comprises:

information about a product or service purchased by the user from the merchant affiliate.

8. The system of claim 7, wherein the computer server for identifying a suggested product or service, is further configured for:

using a pattern classifier to determine a suggested product or service based on the product or service purchased by the user from the merchant affiliate.

9. The method of claim 8, wherein the computer server for selecting a suggested merchant associated with a location within the search vicinity based on the suggested product or service, is further configured for:

accessing an affiliate record associated with a candidate merchant;

determining if the affiliate record indicates that the candidate merchant sells the suggested product or service and that the candidate merchant is associated with a location within the search vicinity; and responsive to the determining that the affiliate record indicates that the candidate merchant sells the suggested product or service and that the candidate merchant is associated with a location within the search vicinity, selecting the candidate merchant.

* * * * *